United States Patent
Nordhoff et al.

(10) Patent No.: US 6,780,206 B2
(45) Date of Patent: Aug. 24, 2004

(54) CRYSTALLIZATION PROCESS FOR PRODUCING HIGHLY CONCENTRATED HYDROGEN PEROXIDE

(75) Inventors: Stefan Nordhoff, Aschaffenburg (DE); Matthias Creutz, Frankfurt (DE); Stefan Gross, Langenselbold (DE); Rudolf Wagner, Grosskrotzenburg (DE)

(73) Assignee: Degussa AG, Düsseldorf (DE)

( * ) Notice: Subject to any disclaimer, the term of this patent is extended or adjusted under 35 U.S.C. 154(b) by 163 days.

(21) Appl. No.: 09/997,271

(22) Filed: Nov. 30, 2001

(65) Prior Publication Data

US 2002/0068035 A1 Jun. 6, 2002

(30) Foreign Application Priority Data

Dec. 2, 2000 (DE) .......................................... 00 126 387

(51) Int. Cl.⁷ ............................. B01D 9/00; C01B 15/01
(52) U.S. Cl. ..................................... 23/295 R; 423/584
(58) Field of Search ......................... 423/584; 23/295 R

(56) References Cited

U.S. PATENT DOCUMENTS

| | | | | |
|---|---|---|---|---|
| 5,130,053 A | * | 7/1992 | Feasey et al. | 252/400.22 |
| 5,733,521 A | * | 3/1998 | Minamikawa et al. | 423/584 |
| 5,851,505 A | * | 12/1998 | Nishide et al. | 423/584 |
| 5,928,621 A | | 7/1999 | Ledon et al. | |
| 6,001,324 A | * | 12/1999 | Ledon et al. | 423/584 |
| 6,054,109 A | * | 4/2000 | Saito et al. | 423/584 |
| 6,296,829 B1 | * | 10/2001 | Devos et al. | 423/584 |

FOREIGN PATENT DOCUMENTS

| | | |
|---|---|---|
| DE | 10 41 479 B | 10/1958 |
| DE | 1 041 479 | 11/1960 |
| EP | 0 193 226 B1 | 9/1986 |
| EP | 0 193 226 A | 9/1986 |
| EP | 000426949 A1 * | 5/1991 |
| GB | 889 421 A | 2/1962 |
| NL | 1007687 | 8/1999 |

OTHER PUBLICATIONS

US 20020068035A1.*
US 20020062536A1.*
Patent Abstracts of Japan, vol. 1997; No. 07, Jul. 31, 1997.
International Search Report issued for corresponding European Appln. No. EP 01 12293 dated Apr. 22, 2002.
Dr. Ing. S. Lemmer, et al., "Abwasservorkonzentrierung nach dem Niro Freeze Concentration Process", Chemie Ingenieur Technik, vol. 72, 2000, pp. 1229–1233. (German Language).
Georg Wellinghoff, et al., "Schmelzkristallisation—theoretische Voraussetzungen und technische Grenzen", Chem. Ing. Tech. vol. 63, 1991, pp. 881–891. (German Language).
Walter C. Schumb, et al., Hydrogen Peroxide, Reinhold Publishing Corporation, 1955, pp. 209–221 and pp. 302–309.

* cited by examiner

Primary Examiner—Wayne A. Langel
Assistant Examiner—William G. Wright, Sr.
(74) Attorney, Agent, or Firm—Smith, Gambrell & Russell, LLP

(57) ABSTRACT

A process for the continuous preparation of very highly concentrated hydrogen peroxide having a content of greater than 80 wt.%, especially over 98 wt.%, by suspension crystallization and after-treatment of the $H_2O_2$ crystals. The after-treatment takes the form of countercurrent washing in a hydraulic or mechanical washing column with a packed crystal bed. Hydrogen peroxide is disclosed having a concentration of from 99.9 to 100 wt.% and a content of TOC, nitrate, phosphate, nickel and tin of in each case less than 4 mg/l.

20 Claims, 1 Drawing Sheet

CRYSTALLIZATION PROCESS FOR PRODUCING HIGHLY CONCENTRATED HYDROGEN PEROXIDE

INTRODUCTION AND BACKGROUND

The present invention is directed towards a process for the preparation of very highly concentrated hydrogen peroxide of concentration $c_P$ from aqueous hydrogen peroxide of concentration $C_E$, $C_E$ being at least 80 wt. % and $C_P$ being greater than $C_E$, comprising continuous suspension crystallization with subsequent washing of the hydrogen peroxide that has crystallized out. The process is directed especially towards the preparation of over 98 wt. % hydrogen peroxide from approximately 90 wt. % hydrogen peroxide, as well as at least 99.9 wt. % hydrogen peroxide of very high purity obtainable according to the process.

In the known processes for the preparation of hydrogen peroxide, such as the anthraquinone cyclic process, electrolytic processes and methods of direct synthesis, hydrogen peroxide is obtained in the form of an aqueous solution. In order to convert such solutions into marketable products, the preparation is usually followed by concentration of the solution by distillation. By means of distillation it is possible to obtain aqueous hydrogen peroxide solutions having a content of up to approximately 90 wt. % hydrogen peroxide. Cost and safety considerations stand in the way of further concentration by distillation.

More highly concentrated hydrogen peroxide, that is to say products having an $H_2O_2$ content in the range of from equal to/greater than 90 wt. % to approximately 98 wt. %, are increasingly gaining importance commercially owing to their high energy content and their high purity. It is known that hydrogen peroxide can be concentrated by repeated recrystallization. Fundamental aspects regarding the crystallization of hydrogen peroxide, as well as the solid-liquid phase diagram of the hydrogen peroxide/water system, are known from the reference book "Hydrogen Peroxide" by Walter C. Schumb et al., Reinhold Publishing Corp. (1955), p. 210–220. According to that book, a prominent property of highly concentrated aqueous hydrogen peroxide is the tendency to extreme supercooling, which makes concentration by crystallization more difficult. According to Schumb et al. (page 215), crystal formation is not affected in a reproducible manner either by stirring or scraping or by the cooling rate. However, freezing of supercooled highly concentrated hydrogen peroxide is induced by seeding with hydrogen peroxide crystals. The low efficiency of fractional batch crystallization is regarded as being a disadvantage of concentration by crystallization (Schumb et al., p. 215), since an increase in concentration of only approximately 2% and never more than 4% is achieved per crystallization stage. That problem is evidently the result of the high boundary solubility, that is to say mixed crystal formation, of water in crystallized hydrogen peroxide, which is also shown in the phase diagram (Schumb, page 211). Because of that boundary solubility, it has hitherto not been possible, according to the experience of the present inventors, to obtain hydrogen peroxide having a content of at least 99.9 wt. % by fractional crystallization.

DE-PS 10 41 479 teaches a continuous process for the concentration of aqueous hydrogen peroxide solutions, which process also allows very highly concentrated hydrogen peroxide to be obtained. The apparatus for concentration comprises a crystallizing vessel and a rectifying column arranged directly beneath it. The hydrogen peroxide starting material is supercooled in the crystallizing vessel until there forms a 2-phase system consisting of a solid crystal phase and a liquid mother liquor, which phases differ according to the equilibrium with regard to the hydrogen peroxide concentration. The temperature along the rectifying column is so controlled that it increases slowly from the upper to the lower end. Owing to the higher density of the crystallized hydrogen peroxide, the crystals sink downwards in the rectifying column, a solid-liquid exchange of material taking place until the respective equilibrium has been reached and the $H_2O_2$ concentration in the crystals increasing towards the bottom; the $H_2O_2$ concentration in the mother liquor falls towards the top. Because there is only a slight difference in density between the crystallized hydrogen peroxide and the hydrogen peroxide mother liquor, the process is characterized by a low space-time yield. A further very considerable disadvantage that prevents the prior-known process from being applied on an industrial scale consists in scale-up problems (application of the process on an industrial scale): as the diameter of the rectifying column increases, unforeseeable back-mixing occurs, as a result of which both the function is impaired and the process risk is increased considerably (see Wellinghoff et al. in Chem.-Ing.-Tech. 63 (1991), 881–882).

The rectifying column according to DE-PS 10 41 479 is in principle operated as a gravity washing column. In the lowermost portion of the column, some of the crystals melt again and the melt thus acts as the washing medium. In such washing columns, working on the countercurrent principle, solid-liquid separation and further purification of the solid take place in one apparatus, but the scale-up problems remain, even when the suspension crystallization according to the invention described below is carried out.

Although the above-indicated scale-up problems can be avoided, as has been described in the as yet unpublished patent application DE 100 54 742.7, by means of a layer crystallization process with a subsequent sweating operation, the advantage of the simple separation of solid and liquid that can be carried out without problems even on a large scale is, however, offset by the disadvantages of discontinuous, multi-stage operation and the higher energy requirement.

Accordingly, an object of the present invention is to provide a continuous process for the preparation of very highly concentrated hydrogen peroxide from at least 80 wt. % aqueous hydrogen peroxide, which process can be carried out without problems even on an industrial scale.

According to a further object of the invention it is desired to obtain over 98 wt. %, preferably at least 99.9 wt. %, hydrogen peroxide from approximately 90 wt. % hydrogen peroxide in one step.

A still further object, in addition to concentrating and hence obtaining substantially anhydrous hydrogen peroxide, is directed towards lowering the content of impurities, such as organic carbon and conventional stabilizers. Conventional impurities are process-dependent secondary constituents, and stabilizers added during/after the preparation of the $H_2O_2$ starting material to be concentrated.

SUMMARY OF THE INVENTION

The above and other objects can be achieved in a simple manner and with an unforeseeably high degree of efficiency by means of the process according to the invention.

Accordingly, the invention provides a process for the continuous preparation of very highly concentrated hydrogen peroxide of concentration $C_P$ from aqueous hydrogen peroxide of concentration $C_E$, $C_E$ being at least 80 wt. % and $C_P$ being greater than $C_E$, comprising suspension crystallizing aqueous hydrogen peroxide of concentration $C_E$ and after-treating the resulting hydrogen peroxide crystals contained in the suspension. In further detail, the process is characterised in that the after-treatment takes the form of countercurrent washing in a hydraulic or mechanical washing column with a packed crystal bed, and molten hydrogen peroxide of concentration $C_P$ is used as the washing medium. The dependent claims are directed towards preferred embodiments of the process according to the invention.

The process is especially suitable for concentrating aqueous hydrogen peroxide having a concentration $C_E$ in the range from 85 to 95 wt. %, especially from 88 to 92 wt. %, in a single step, preferably to a concentration $C_P$ of over 98 wt. %, but especially equal to or greater than 99.9 wt. %. In addition to concentration of the $H_2O_2$ starting material, the content of impurities is at the same time lowered to surprisingly low values. For example, the TOC content (total organic carbon) of, for example, from 40 to 50 mg/kg in the $H_2O_2$ starting material can be reduced in one step to a value below approximately 3 mg/l of $H_2O_2$ product. The content of other secondary constituents and stabilizers, such as phosphate, tin and nitrate, can also be reduced to values below the detection limit of conventional analytical methods, generally to values below 3 mg in each case, especially below 1 mg/kg of $H_2O_2$ product.

Accordingly, the present invention also provides hydrogen peroxide having a concentration of from 99.9 to 100 wt. % and a content of TOC, nitrate, phosphate, nickel and tin of less than 4 mg/l in each case. The 99.9 to 100 wt. % hydrogen peroxide preferably contains less than 1 mg of Ni and Sn per liter of $H_2O_2$ and less than 2 mg of phosphate per liter of $H_2O_2$.

The substantially anhydrous hydrogen peroxide obtainable according to the invention and having an extraordinarily low content of impurities can be used, for example, as a motor fuel, as an oxidizing agent or for electronics purposes, such as the preparation of solutions for the treatment of electronic components. If required, it is also possible to add to the very highly concentrated and very pure $H_2O_2$ an effective amount of one or more auxiliary substances directed towards the particular application or/and of stabilizers known per se or of a stabilizer combination. Suitable stabilizers are, for example, tin compounds, phosphates, di- and triphosphates, phosphonates and radical acceptors. The very high purity of the $H_2O_2$ product that can be achieved by means of the process according to the invention is, therefore, a way of replacing a stabilizer combination contained in the $H_2O_2$ starting material by other auxiliary substances/active ingredients in the $H_2O_2$ product.

BRIEF DESCRIPTION OF DRAWING

The present invention will be further understood with reference to the accompanying drawing which shows a schematic flow diagram of the process.

DETAILED DESCRIPTION OF INVENTION

Figure 1:
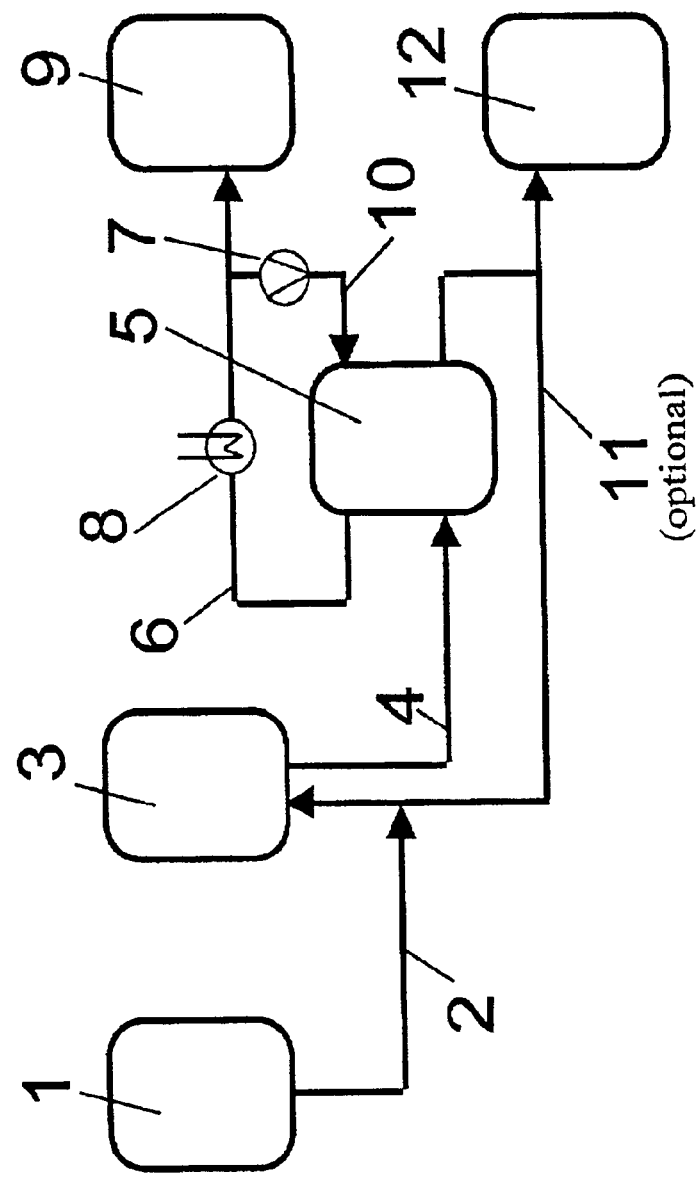

The fundamental principle of the process according to the invention comprises the production of a crystal suspension in any desired single- or multi-stage crystallizer, cooling being effected via walls of the apparatus or by evaporation in vacuo, subsequent solid-liquid separation, countercurrent washing of the crystals, and melting of the concentrated and purified crystals.

Examples of suitable crystallizers are: stirrer vessel crystallizer, scraper-type crystallizer, cooling plate crystallizer, crystallizing screw, drum crystallizer, tube-bundle crystallizer. Suitable devices for the solid-liquid separation are conventional devices, such as filters and centrifuges, it also being possible to thicken the suspension beforehand by means of a hydrocyclone. Separation and washing are preferably carried out in a single apparatus, for example in a hydraulic or mechanical washing column with a packed crystal bed.

A scraper-type cooler or scraper-type crystallizer that is preferably to be used is a container that is cooled via the outside wall or a container containing cooling plates, in which the aqueous hydrogen peroxide to be concentrated is supercooled to such an extent that hydrogen peroxide crystals crystallize on the inside or on the cooling plates and can be removed by a revolving scraper or blade to form individual crystals or flakes. The crystals are held in suspension by suitable measures, such as stirring. According to the invention, hydrogen peroxide of concentration $C_E$ is fed continuously to the crystallizer; the crystal suspension that forms is fed continuously to the hydraulic or mechanical washing column used for the combined solid-liquid separation and countercurrent washing.

Surprisingly, when a scraper-type crystallizer or other crystallizers based on a comparable principle are used, the starting material must only be cooled marginally below the equilibrium temperature in order to form crystal nuclei. Cooling in the range from greater than 0 to 5 K, especially from 0.5 to 3 K, below the equilibrium temperature is highly suitable. Contrary to the prior art known hitherto (see Schumb, page 219), no appreciable supercooling and no addition of seed crystals are required when a scraper-type crystallizer or crystallizers having an equivalent action are used, as a result of which more efficient concentration and purification are possible. In order to achieve adequate crystal growth following nucleation and hence a suitable suspension density for the solid-liquid separation with subsequent washing, cooling is carried out to the temperature required therefor according to the phase diagram.

According to an especially preferred embodiment, the suspension removed from the crystallizer is fed continuously into an apparatus for solid-liquid separation that at the same time is operated as a washing column. In contrast to the rectifying column described in the prior art for the concentration of hydrogen peroxide, which, for an industrial installation, would have to be in the form of a gravity column/washing column, it is possible by using a hydraulic or mechanical washing column to avoid the disadvantages that occur with a gravity column on scale-up, including incalculable back-mixing. In a hydraulic or mechanical washing column to be used according to the invention, the crystals are conveyed in the axial direction by hydraulic or mechanical forces, so that a tightly packed crystal bed forms.

In a conventional embodiment of a hydraulic washing column, the suspension is introduced in the upper portion of the column; the liquid phase (mother liquor) is removed from the column via a filter, as a result of which a tightly packed crystal bed forms. The liquid phase flows through the crystal bed in the direction towards the base of the column, and the crystal bed is pressed downwards as a result of the flow resistance. At the base of the column there is a rotating scraping device, which produces a suspension again from the tightly packed crystal bed and the washing melt introduced in the lower portion of the washing column. The suspension is pumped through a heat exchanger and melted.

A portion of the melt is used as the washing melt; it is pumped back into the column and washes the crystal bed moving in the opposite direction. On the one hand the washing melt effects washing of the crystals, on the other hand the melt crystallizes on the crystals. The enthalpy of crystallization that is liberated warms the crystal bed in the washing region of the column.

In a mechanical washing column—reference is made, for example, to EP 0 193 226 B and NL 1007687 A—a dense crystal bed is produced inside the column by means of a plunger that is permeable to the melt. The plunger may be located at the upper or lower end of the column; in the first case, the suspension is fed in in the upper region of the column, in the second case it is fed in in the middle or lower region. The plunger is permeable to the melt so that, on compression, melt emerges from the rear side of the plunger, where it is drawn off. Analogously to a hydraulic washing column, the mechanical washing column also contains a scraping device, for example a rotating scraping member, in order to scrape off crystals from the crystal bed and convert them into a suspension with the washing melt. The washing melt flows in the opposite direction to the crystal bed. Suspension is removed from the side of the washing column opposite the plunger and, after melting, a portion of the melt is fed back as the washing melt and the other portion is discharged from the circuit as very pure product.

Suitable apparatuses and processes for melt crystallization using a mechanical or hydraulic washing column, which are used by those skilled in the art for purposes other than the concentration of $H_2O_2$, are the so-called Phillips pulsation column, Phillips pressure column, Brennan-Koppers process, Niro-Grenco freeze-concentration and the TNO process. Embodiments for suspension crystallization with subsequent washing of the crystals in a hydraulic or mechanical washing column are to be found in the book "Melt Crystallization Technology" by G. F. Arkenbout, Technomic Publishing Co. Inc., Lancaster-Basel (1995), p. 265–288, and in the article, relating to Niro freeze-concentration for waste-water pre-concentration, in Chemie Ingenieur Technik (72) (10/2000), 1231–1233.

The Figure shows a process diagram in which the process is described in summary:

From the storage container 1, the starting material to be crystallized, in the liquid state, that is to say at a temperature just above equilibrium, is fed via the inlet 2 into the suspension generator, preferably a scraper-type cooler. By cooling the starting material below the equilibrium temperature, crystal nuclei first form in the suspension generator and, by further cooling, the suspension density increases continuously. The suspension density is generally in the range from 5 to 80%, preferably from 20 to 50% and especially from 20 to 30%. The suspension is fed continuously via the inlet 4 into a mechanical washing column 5 and is there separated, via a moving filtering device, into a liquid phase and a solid phase. The filtrate leaves the washing column and is fed continuously to the mother liquor container 12. In order to increase the yield it is advantageous to feed a portion of the filtrate back into the suspension generator 3 via the mother liquor return 11. The crystals in the washing column are compressed to form a crystal bed and, depending on the type of washing column, are scraped off at the top or the bottom by means of revolving blades. The product crystals that have been scraped off are pumped round in the form of a suspension in the product circuit 6 by means of the circulating pump 7 and melt owing to the introduction of the enthalpy of fusion by means of a heat exchanger 8. A portion from the circuit 6 is fed back into the washing column as the washing liquid via pipe 10 for countercurrent washing, the other portion is passed into the product container 9.

Although a combination of a scraper-type crystallizer and a mechanical washing column is known for the preparation of organic substances having high purity, it was not foreseeable that such a process would also be highly suitable for the concentration of aqueous hydrogen peroxide that forms mixed crystals even with water, for the purposes of obtaining very highly concentrated and especially pure hydrogen peroxide. In view of the properties of concentrated hydrogen peroxide, which are to be found in the phase diagram of the Schumb document mentioned above, it was not to be expected that concentration in the region of about/over 10% could be achieved in one step. As mentioned above, it was also not to be expected that not only over 98 wt. %, but also equal to/greater than 99.9 wt. % $H_2O_2$, that is to say substantially 100 wt. % $H_2O_2$, would be obtainable. Also surprising was the fact that the content of impurities, such as organic carbon, phosphate and heavy metals, falls to values below the detection limit by means of the process according to the invention.

EXAMPLES

1. In an apparatus according to the Figure having a scraper-type crystallizer for producing a suspension and a mechanical washing column with a plunger arranged at the bottom and an outlet for the purified melt arranged at the top, aqueous hydrogen peroxide having a concentration $C_E$=89.7 wt. % was used. The starting material was cooled to approximately 3 K below the equilibrium temperature of $-12.2°$ C. Surprisingly, crystallization occurred without the addition of seed crystals. By further cooling to $-21°$C., further crystallization was effected, the suspension density increasing. The crystal suspension removed from the crystallizer was compressed in the washing column to form a compact crystal bed. The upper side of the crystal bed was scraped away by means of a rotating scraper and formed with the washing melt introduced in that region, that is to say hydrogen peroxide of concentration $C_P$, a crystal suspension, which was melted in the product circuit and a portion of which was fed back into the crystal bed for the countercurrent washing. Hydrogen peroxide having a concentration of substantially 100 wt. % was obtained. The TOC content was reduced from approximately 40 mg/kg in the starting material to less than 4 mg/l in the product. The Sn, Ni, nitrate and phosphate contents in the $H_2O_2$ product were also below their respective detection limits, which were <0.02 mg of Sn/l, <1 mg of Ni/l and <2 mg of phosphate/l.

2. Using an aqueous hydrogen peroxide having a content of 87.5 wt. %, supercooling to $-16°$ C. for nucleation purposes and further cooling to $-26°$ C. in order to achieve an adequate suspension density, and solid/liquid separation and washing in the mechanical washing column also used in Example 1, identical results were achieved.

Further variations and modifications of the foregoing will be apparent to those skilled in the art and are intended to be encompassed by the claims appended hereto.

European priority application 00 126 387.0 is relied on and incorporated herein by reference.

We claim:

1. A process for the continuous preparation of concentrated hydrogen peroxide of concentration cp from aqueous hydrogen peroxide of concentration $c_E$, $c_E$ being at least 80 weight percent and cp being greater than $c_E$, comprising:

suspension crystallizing aqueous hydrogen peroxide of concentration $c_E$ to obtain hydrogen peroxide crystals in a suspension and after-treating of the hydrogen peroxide crystals contained in the suspension, wherein the after-treating takes the form of countercurrent washing in a hydraulic or mechanical washing column with a packed crystal bed, and washing said hydrogen peroxide crystals with molten hydrogen peroxide of concentration cp as the washing medium.

2. The process according to claim 1, further comprising concentrating aqueous hydrogen peroxide of concentration $c_E$ in the range from 85 to 95 weight percent, in one step to a concentration cp of over 98 wt. %.

3. The process according to claim 1, further comprising concentrating aqueous hydrogen peroxide of concentration $c_E$ in the range from 88 to 92 wt. %, in one step to a concentration cp of equal to or greater than 99.9 wt. %.

4. The process according to claim 1, wherein the suspension crystallizing is carried out in a single- or multi-stage scraper-type crystallizer.

5. The process according to claim 2, wherein the suspension crystallizing is carried out in a single- or multi-stage scraper-type crystallizer.

6. The process according to claim 3, wherein the suspension crystallizing is carried out in a single- or multi-stage scraper-type crystallizer.

7. The process according to claim 1, further comprising wherein the suspension crystallizing is carried out in a scraper-type crystallizer, the countercurrent washing of the crystals, combined with solid-liquid separation of the suspension, is carried out in a mechanical washing column, and a portion of the mother liquor that leaves the washing column is fed back into the scraper-type crystallizer.

8. The process according to claim 2, further comprising wherein the suspension crystallizing is carried out in a scraper-type crystallizer, the countercurrent washing of the crystals, combined with solid-liquid separation of the suspension, is carried out in a mechanical washing column, and a portion of the mother liquor that leaves the washing column is fed back into the scraper-type crystallizer.

9. The process according to claim 3, further comprising wherein the suspension crystallizing is carried out in a scraper-type crystallizer, the countercurrent washing of the crystals, combined with solid-liquid separation of the suspension, is carried out in a mechanical washing column, and a portion of the mother liquor that leaves the washing column is fed back into the scraper-type crystallizer.

10. The process according to claim 4, further comprising wherein the suspension crystallizing is carried out in a scraper-type crystallizer, the countercurrent washing of the crystals, combined with solid-liquid separation of the suspension, is carried out in a mechanical washing column, and a portion of the mother liquor that leaves the washing column is fed back into the scraper-type crystallizer.

11. The process according to claim 5, further comprising wherein the suspension crystallizing is carried out in a scraper-type crystallizer, the countercurrent washing of the crystals, combined with solid-liquid separation of the suspension, is carried out in a mechanical washing column, and a portion of the mother liquor that leaves the washing column is fed back into the scraper-type crystallizer.

12. The process according to claim 4, further comprising nucleation in the suspension crystallizing is carried out at a temperature in the range from greater than 0 to 5 K, below the equilibrium temperature of the $H_2O_2$ starting materiel, and the temperature is then lowered further until a suspension density in the range from 5 to 80% is achieved.

13. The process according to claim 4, further comprising nucleation in the suspension crystallizing is carried out at a temperature in the range from greater than 0.5 to 3 K, below the equilibrium temperature of the $H_2O_2$ starting materiel, and the temperature is then lowered further until a suspension density in the range from 5 to 80% is achieved.

14. The process according to claim 7, further comprising nucleation in the suspension crystallizing is carried out at a temperature in the range from greater than 0 to 5 K, below the equilibrium temperature of the $H_2O_2$ starting material, and the temperature is then lowered further until a suspension density in the range from 5 to 80% is achieved.

15. The process according to claim 1, wherein the suspension crystallization is carried out to a suspension density in the range from 20 to 50%.

16. The process according to claim 1, wherein the suspension crystallization is carried out to a suspension density in the range from 20 to 30%.

17. The process according to claim 1, further comprising hydrogen peroxide having a concentration c p of at least 98 wt. %, that leaves the washing column in the form of a melt is stabilized with an effective amount of one or more stabilizers.

18. The process according to claim 1, further comprising hydrogen peroxide having a concentration c p of at least 99 wt. %, that leaves the washing column in the form of a melt is stabilized with an effective amount of one or more stabilizers.

19. The process according to claim 1, further comprising hydrogen peroxide having a concentration cp of at least 99 wt. %, that leaves the washing column in the form of a melt is stabilized with a stabilizer selected from the group of tin compounds, phosphates, di- and tri-phosphates, phosphonates and radical acceptors.

20. A process for the continuous preparation of concentrated hydrogen peroxide of concentration cp from aqueous hydrogen peroxide of concentration $c_E$, as the $H_2O_2$ starting material $c_E$ being at least 80 wt. % and cp being greater than $c_E$, comprising:

suspension crystallizing aqueous hydrogen peroxide of concentration $c_E$ by nucleating at a temperature in the range from greater than 0 to 5 K, below equilibrium temperature of the $H_2O_2$ starting material, and lowering the temperature further until a suspension density in the range from 5 to 80% is achieved, to obtain hydrogen peroxide crystals in a suspension and after-treating said hydrogen peroxide crystals contained in the suspension, by countercurrent washing said hydrogen peroxide crystals in a hydraulic or mechanical washing column with a packed crystal bed, with molten hydrogen peroxide of concentration cp as the washing medium.

* * * * *